US010123474B2

(12) United States Patent
Freiberg et al.

(10) Patent No.: US 10,123,474 B2
(45) Date of Patent: Nov. 13, 2018

(54) SYSTEM AND METHOD FOR CONTROLLING MACHINERY FOR RANDOMIZING AND REPLICATING PREDETERMINED AGRONOMIC INPUT LEVELS

(71) Applicant: Premier Crop Systems, LLC, Des Moines, IA (US)

(72) Inventors: Dan Freiberg, West Des Moines, IA (US); Mark William Stelford, Sycamore, IL (US)

(73) Assignee: Premier Crop Systems, LLC, Des Moines, IA (US)

( * ) Notice: Subject to any disclaimer, the term of this patent is extended or adjusted under 35 U.S.C. 154(b) by 40 days.

(21) Appl. No.: 14/833,670

(22) Filed: Aug. 24, 2015

(65) Prior Publication Data
US 2016/0057922 A1    Mar. 3, 2016

Related U.S. Application Data

(60) Provisional application No. 62/042,555, filed on Aug. 27, 2014.

(51) Int. Cl.
| | | |
|---|---|---|
| A01B 79/00 | (2006.01) |
| A01C 21/00 | (2006.01) |
| A01C 7/10 | (2006.01) |
| A01C 15/00 | (2006.01) |
| A01G 25/16 | (2006.01) |
| A01M 7/00 | (2006.01) |
| A01M 9/00 | (2006.01) |
| G06Q 50/02 | (2012.01) |

(52) U.S. Cl.
CPC ............ *A01B 79/005* (2013.01); *A01C 7/102* (2013.01); *A01C 15/00* (2013.01); *A01C 21/005* (2013.01); *A01G 25/16* (2013.01); *A01M 7/0089* (2013.01); *A01M 9/0092* (2013.01); *G06Q 50/02* (2013.01)

(58) Field of Classification Search
CPC ..... A01B 79/005; A01B 79/02; A01B 69/008; A01M 9/0092; A01M 7/0089; A01G 25/16; A01C 15/00; A01C 7/102; A01C 21/005; A01C 23/007
See application file for complete search history.

(56) References Cited

U.S. PATENT DOCUMENTS

| 5,931,882 A | 8/1999 | Fick et al. |
| 6,606,542 B2 | 8/2003 | Hauwiller et al. |
| (Continued) | | |

FOREIGN PATENT DOCUMENTS

| WO | WO02069230 A1 | 9/2002 |
| WO | WO2012174134 A1 | 12/2012 |

OTHER PUBLICATIONS

International Search Report and Written Opinion dated Nov. 6, 2015 for related PCT Application No. PCT/US2015/046536.

*Primary Examiner* — Spencer D Patton
(74) *Attorney, Agent, or Firm* — Polsinelli PC (57) ABSTRACT

A controller is operatively connected to a dispensing system and configured to change the dispensement of an agricultural input from the dispensing system in different predetermined locations within at least one predefined test plot in a management zone of an agricultural field. The predetermined locations have been randomized and replicated for quantifying the agronomic response in a statistically valid manner.

19 Claims, 9 Drawing Sheets

(56) References Cited

U.S. PATENT DOCUMENTS

| | | |
|---|---|---|
| 6,745,128 B2 | 6/2004 | Hanson |
| 6,990,459 B2 | 1/2006 | Schneider |
| 7,725,233 B2 | 5/2010 | Hendrickson et al. |
| 8,319,165 B2 | 11/2012 | Holland |
| 8,731,836 B2 | 5/2014 | Lindores et al. |
| 8,948,976 B1 * | 2/2015 | Unruh ................ A01C 21/005 111/171 |
| 2014/0297242 A1 * | 10/2014 | Sauder ................ A01C 21/005 703/6 |

* cited by examiner

SYSTEM AND METHOD FOR CONTROLLING MACHINERY FOR RANDOMIZING AND REPLICATING PREDETERMINED AGRONOMIC INPUT LEVELS

This application claims priority to U.S. Provisional Pat. App. No. 62/042,555 filed on Aug. 27, 2014, the contents of which are hereby incorporated by reference herein.

FIELD OF THE INVENTION

This disclosure relates to the management of agricultural plots, and more specifically, to randomizing and replicating agricultural inputs within different management zones of an agricultural field and quantifying the agronomic response.

BACKGROUND

As the demand on the food supply increases and the total viable farmland decreases, methods and systems are needed that maximize crop yields. Maximum crop yields result in increased production of agricultural products and more value per acre of land. However, the effort in maximizing crop yields is difficult, time consuming, and costly in part because the characteristics of farmland vary from acre to acre. This variance is due to factors such as the conditions of the soil and topography. Further, an agricultural farm field may include significant acre-to-acre variations in nutrients, quality of crop produced, and ultimately crop yield.

The current practice is to prescribe agricultural inputs, such as seed and fertilizer, to the entire agricultural farm field according to the needs of the most deficient soil, or according to the averaged requirements of the different soils. The result is that a substantial area of the field can receive either more or less of the item being applied than what the site specific areas can efficiently use to produce agronomic output, resulting in either a significant waste of expensive ag inputs or unrealized yield potential.

Growers and their agronomic advisors can make more accurate input decisions with access to more accurate data of site specific agronomic responses. Agronomic decision making has been driven by a research model that involves yield and other observations from small plots with various treatments. Examples would be yield by applied nitrogen rates or seeding rate. Such testing suffers from the limitation of being able to translate the results observed in a small plot at a research farm to production fields, which typically have different background conditions of soils, fertility, management practices, etc.

It would be desirable to develop a system and method to randomize and replicate agronomic inputs within different management zones of a field to measure the agronomic response to an input within several different contexts: i) management zone specific, ii) region specific and iii) growing season weather specific.

SUMMARY

A system for applying an agricultural input and harvesting an agricultural output in a management zone is disclosed. A machine includes a dispensing system for dispensing the agricultural input. A controller is operatively connected to the dispensing system and configured to change the dispensement of the agricultural input from the dispensing system in different predetermined locations within at least one predefined test plot in a management zone of an agricultural field.

A method for randomizing and replicating predetermined agricultural input levels within a test plot is also disclosed. The method determines an agricultural input for analysis. At least two application rates for the agricultural input are defined. A number of replications for the at least two application rates for the agricultural input is defined. Constraints of a machine that is used for dispensing the agricultural input and a machine for harvesting an agricultural output are defined. The application rates for the agricultural input, the number of replications for the application rates for the agricultural input, and the constraints are associated with an agricultural field. At least one test plot with an area contingent upon the number of application rates defined, the number of replications for the at least two application rates for the agricultural input, and the equipment constraints is defined. Locations (area required defined by equipment constraints) for the application rates for the agricultural inputs are randomly assigned in the test plot. Yield data with an actual agricultural input level in the treatment area of the test plot is obtained for identifying agronomic responses to the treatment levels of the agricultural input (suitable for statistical analysis), which can be aggregated with similar yield data and treatment levels of an agricultural input from agricultural plots in other parts of a geographical area.

DETAILED DESCRIPTION

Figures 8, 8A:
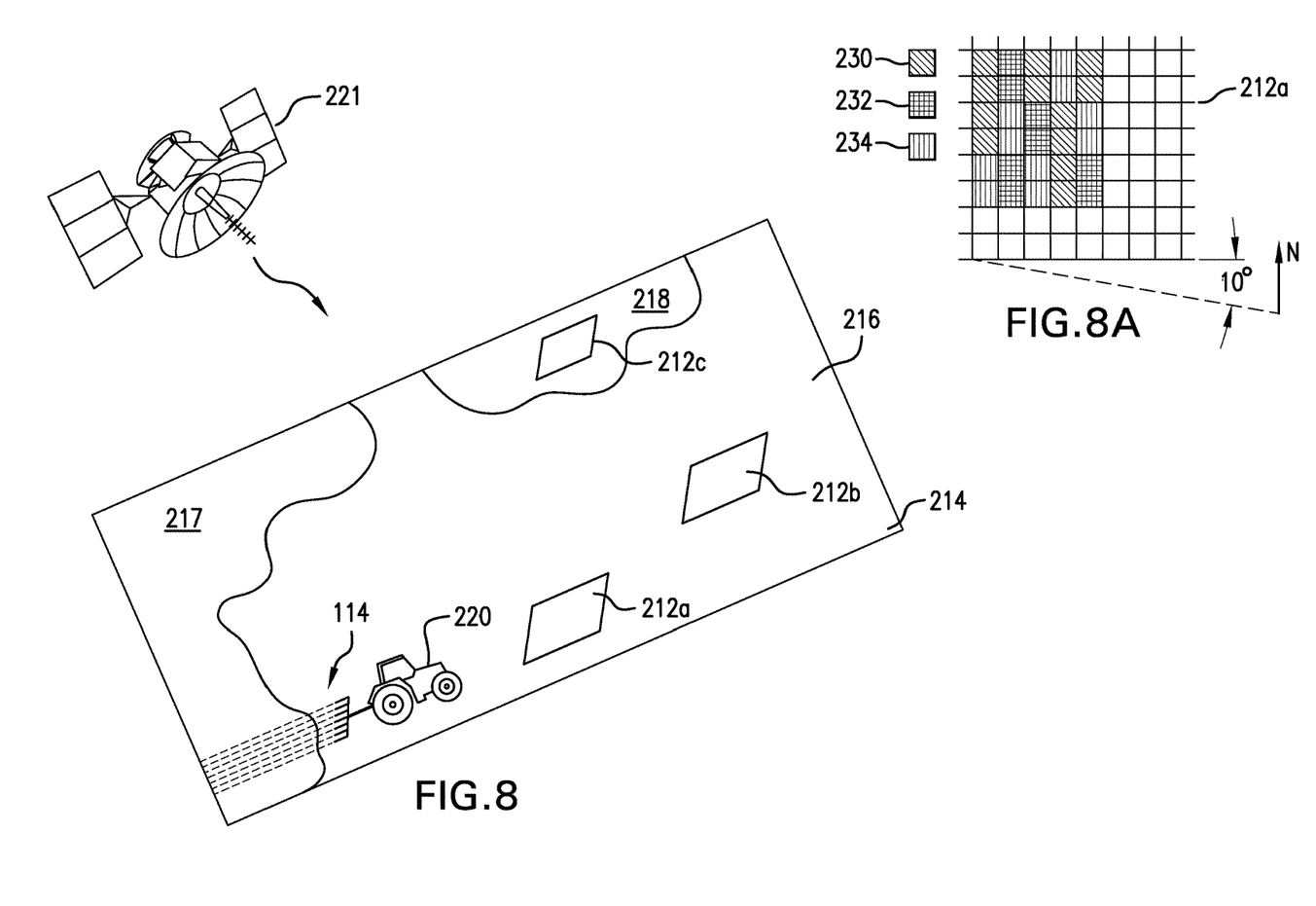
FIG. 8 is an illustration of an agricultural machine carrying out the described and defined testing.
FIG. 8A is a test plot from FIG. 8 showing three treatment levels each replicated multiple times within the test plot.

Disclosed is an integrated and automated system 100 and method to use global positioning system (GPS) to control machines in order to place randomized and replicated agricultural input or treatment levels 114 (Ag inputs 114) within at least one management zone of an agricultural farm field 214. FIG. 8 shows a machine 220 with dispensing system for placing Ag inputs 114 in agricultural farm field 214. The types of Ag inputs 114 that can be controlled include seeding, irrigation, nitrogen or other plant/soil amendment, fungicide, herbicide, insecticide, pesticide, growth regulator, or on/off of the same.

Figure 1:
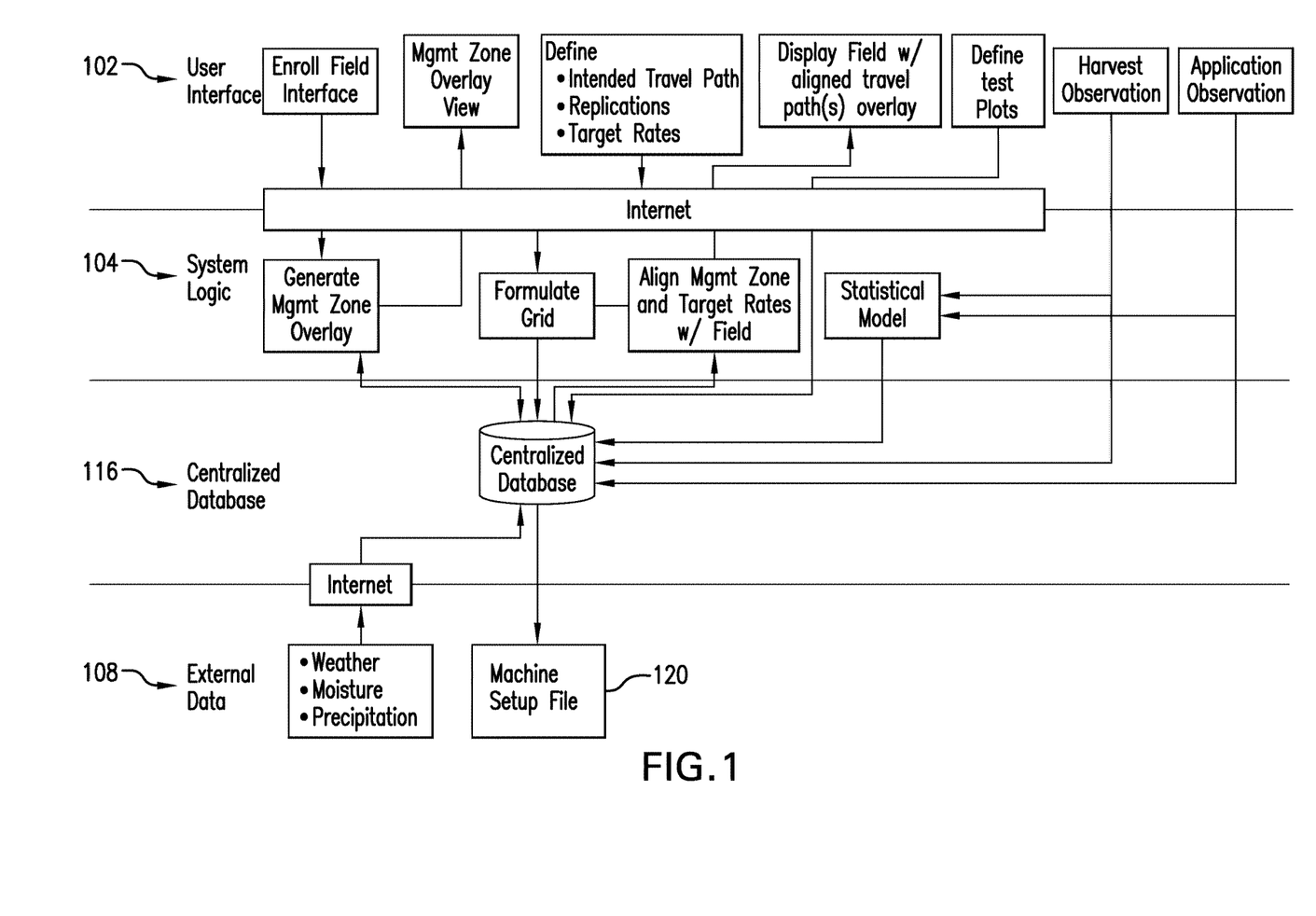
FIG. 1 illustrates an overview of a three-tier architecture of a system made in accordance with the present disclosure and depicting a user interface, system logic, a database, and data inputs and outputs.

FIG. 1 shows system 100 in the form of a process flow chart and accompanying configuration implementing the disclosed system 100. An electronic user interface 102, such as that shown in FIGS. 2-6, is used to interface with system logic 104 and a centralized database 116 to collect, store, and process a map of agricultural farm field 214 (Ag field 202), management zone, input parameters, and agronomic output observations (e.g., yield data and harvest observations).

System logic 104 includes, without limitation: 1) the process and devices for generating a management zone overlay; 2) the process and devices for formulating a grid (oriented with respect to machine travel to optimize execution of test plots); 3) the process and devices for aligning management zones and target input rates within the test plots 212; and 4) the process and devices of providing the randomized spatial location of each replicated treatment level of Ag inputs 114 within each test plot of Ag field 202, with respect to machine capabilities to optimize execution.

FIG. 1 also shows the interaction between the centralized database 116 and system logic 104 where centralized database 116 responds to call for providing data to system logic 104 for mathematical and graphical manipulations, and stores returned values generated by system logic 104. FIG. 1 also shows how centralized database 116 interacts with importation of external data 108 which can include weather, moisture, and precipitation information from weather service providers. Centralized database 116 also exports machine setup file 120 to a machine 220 for field execution of the placing of Ag inputs 114 at predetermined levels within each test plot as well as the other areas of the Ag field 202.

Figure 2:
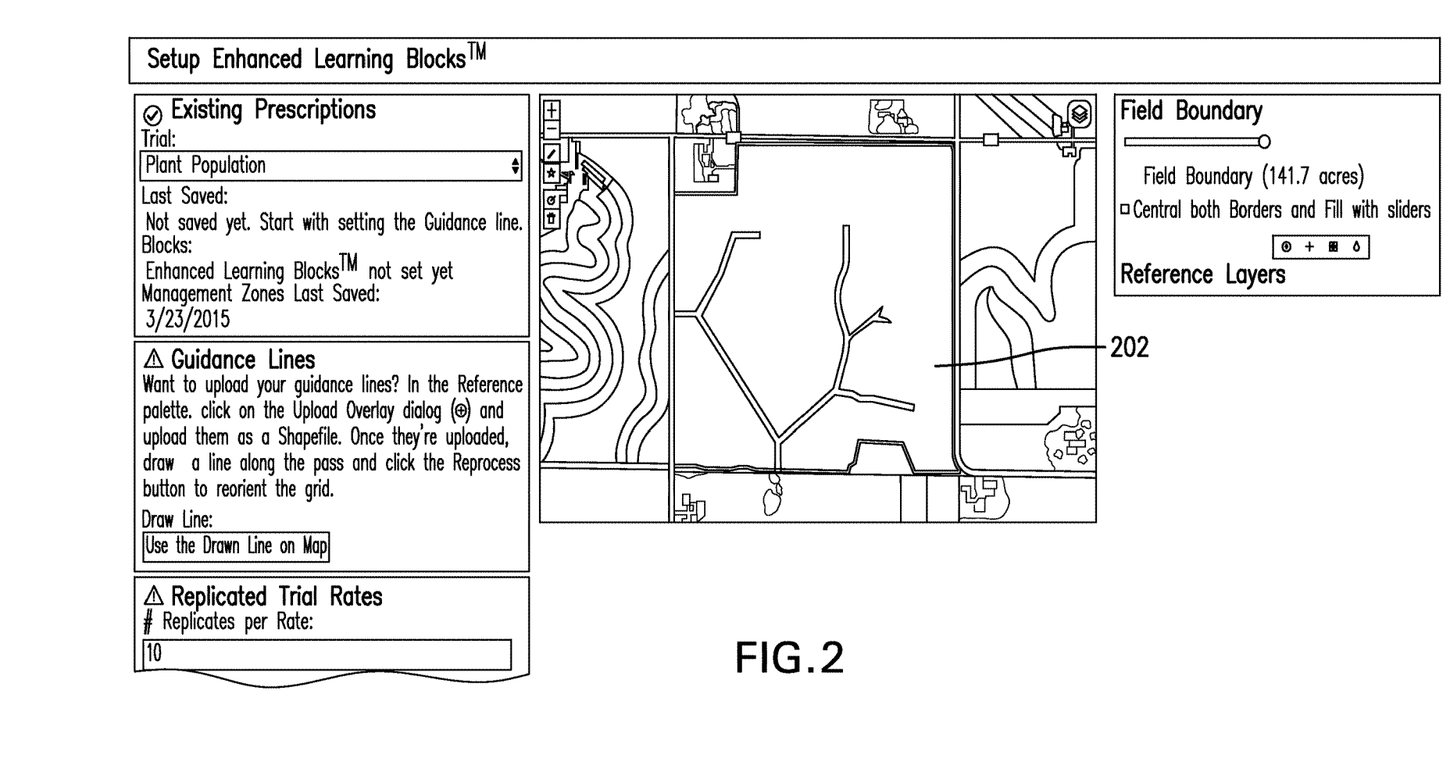
FIG. 2 illustrates a screenshot for uploading a new agricultural plot input in the system of FIG. 1.

What follows is a description of the steps in the operation. FIG. 2 shows Ag field 202. User interface 102 includes an enroll Ag field 202 (as a map) into system 100. Ag field 202 may comprise one or more management zones. A management zone is a sub-region of a field that expresses a relatively homogenous combination of yield-limiting/yield-potential factors for which a single rate of a specific crop input/cultural practice (e.g., tillage depth) is appropriate. Ag field 202 can have previously defined or set management zones and target plant populations. This information can come from the previous years' harvest as well as the current year's agronomy plan in which case it is retrieved by system logic 104 from centralized database 116 to generate a management zone overlay and then provided to user interface 102 as a management zone overlay view.

Figure 3:
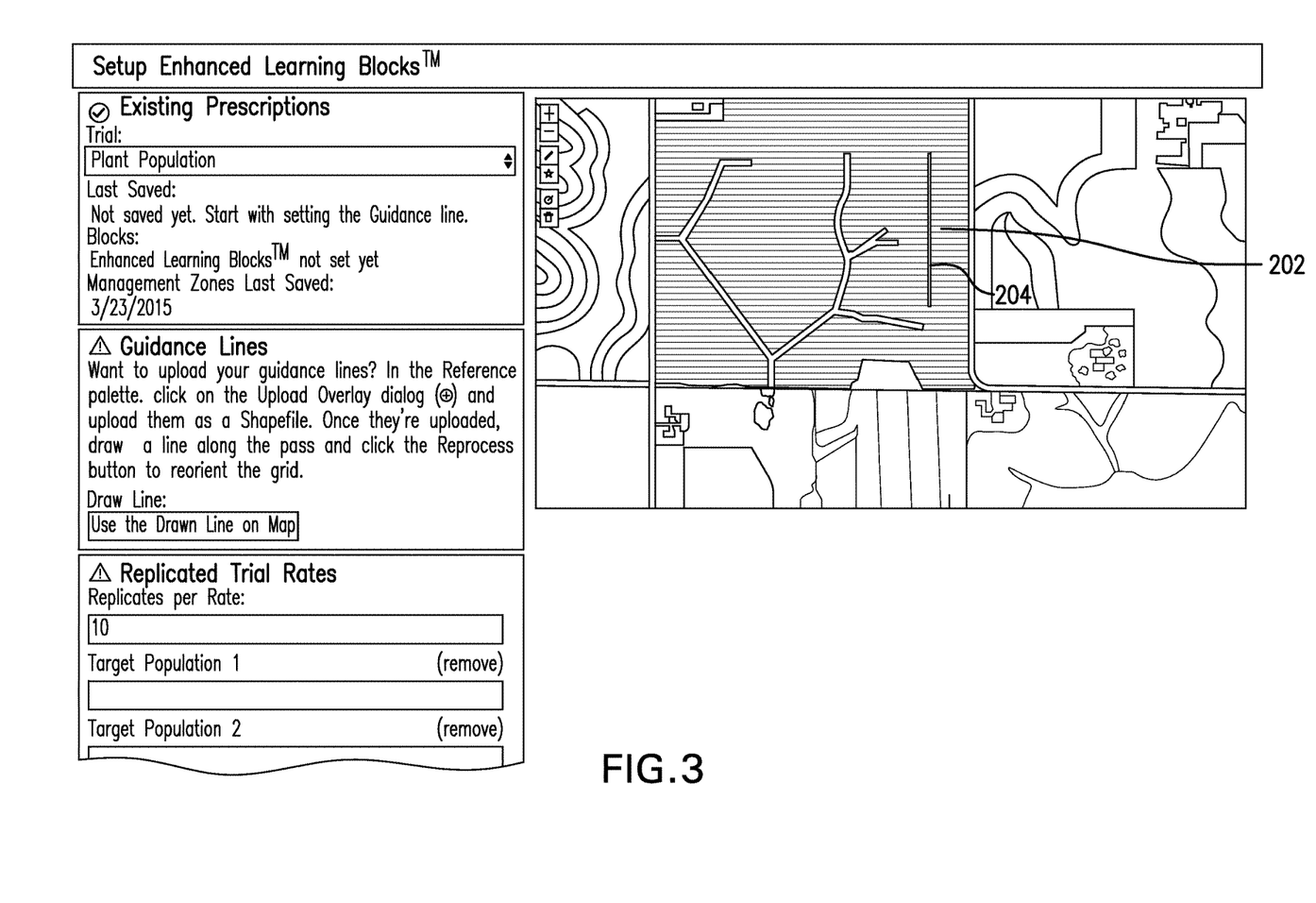
FIG. 3 illustrates a screenshot for adding a guidance line to the agricultural plot input in the system of FIG. 1.

With Ag field 202 enrolled in system 100, machine observation or planting points 206 from the previous year (see FIG. 3A) or machine guidance lines 204 are inputted at user interface 102 into system 100 (while only one machine guidance line 204 is shown those familiar with this technology will recognize that there are many machine guidance lines in Ag field 202). User interface 102 can be used to identify intended machine orientation for the Ag input 114 application in question either manually by user defined orientation for machine 220, using machine guidance lines 204, or using previous record of application travel (e.g., planting points 206). The areas for test plot(s) 212 are ideally laid out with respect to intended machine travel to optimize execution. Machine input instructions such as tillage depth, planting depth, tillage angle, residue spread width, the number of seeds per area, weight of seeds per area, volume per area, and weight per area can be provided at user interface 102. FIG. 3A shows an excerpt from FIG. 3 of the voluminous number of previous year's planting points 206 overlaid on Ag field 202 by system logic 104 and displayed to user at user interface 102.

Figure 4:
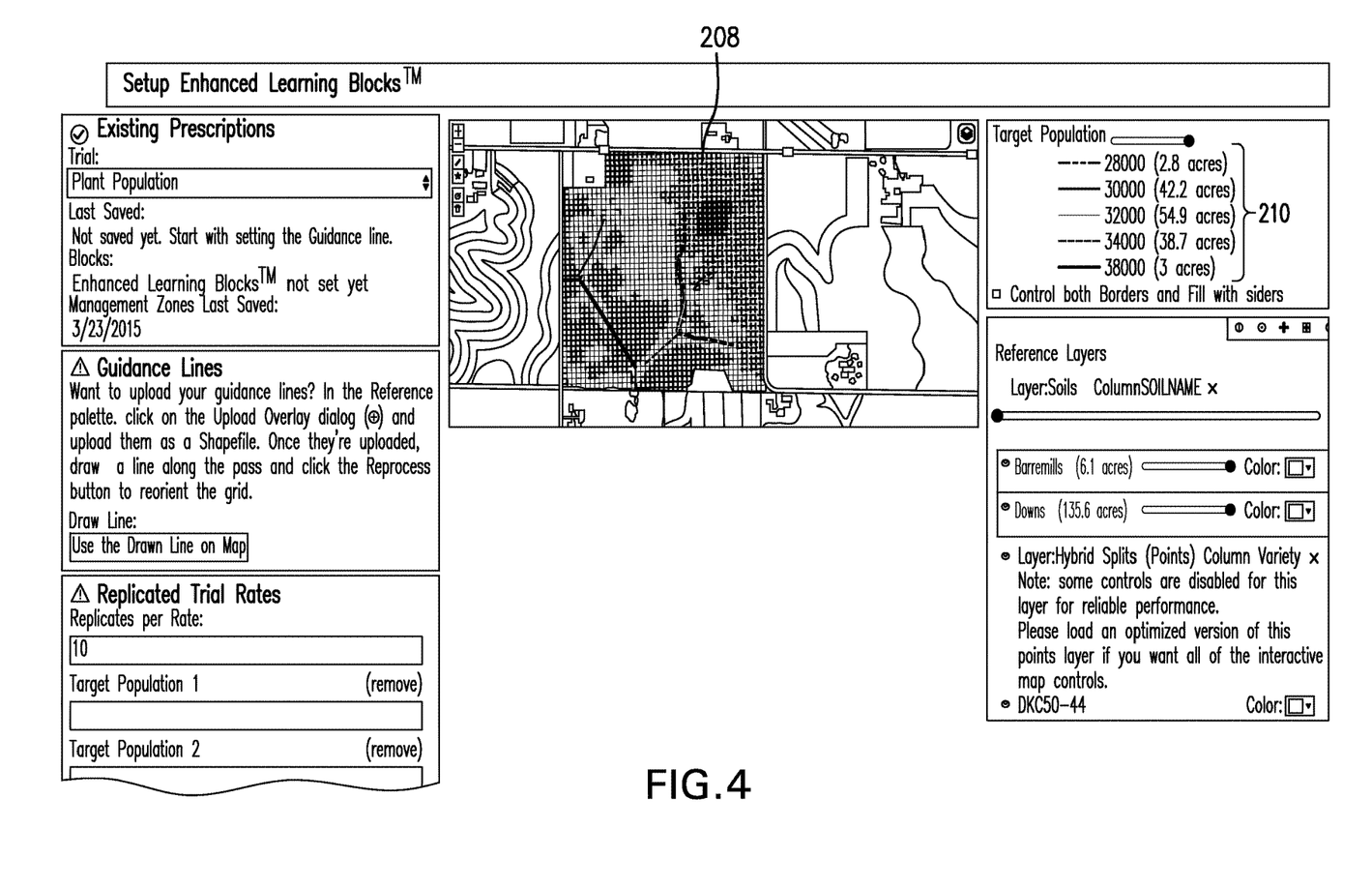
FIG. 4 illustrates a screenshot with the agricultural farm field overlaid with management zones and target seeding populations in the system of FIG. 1.
Figure 5:
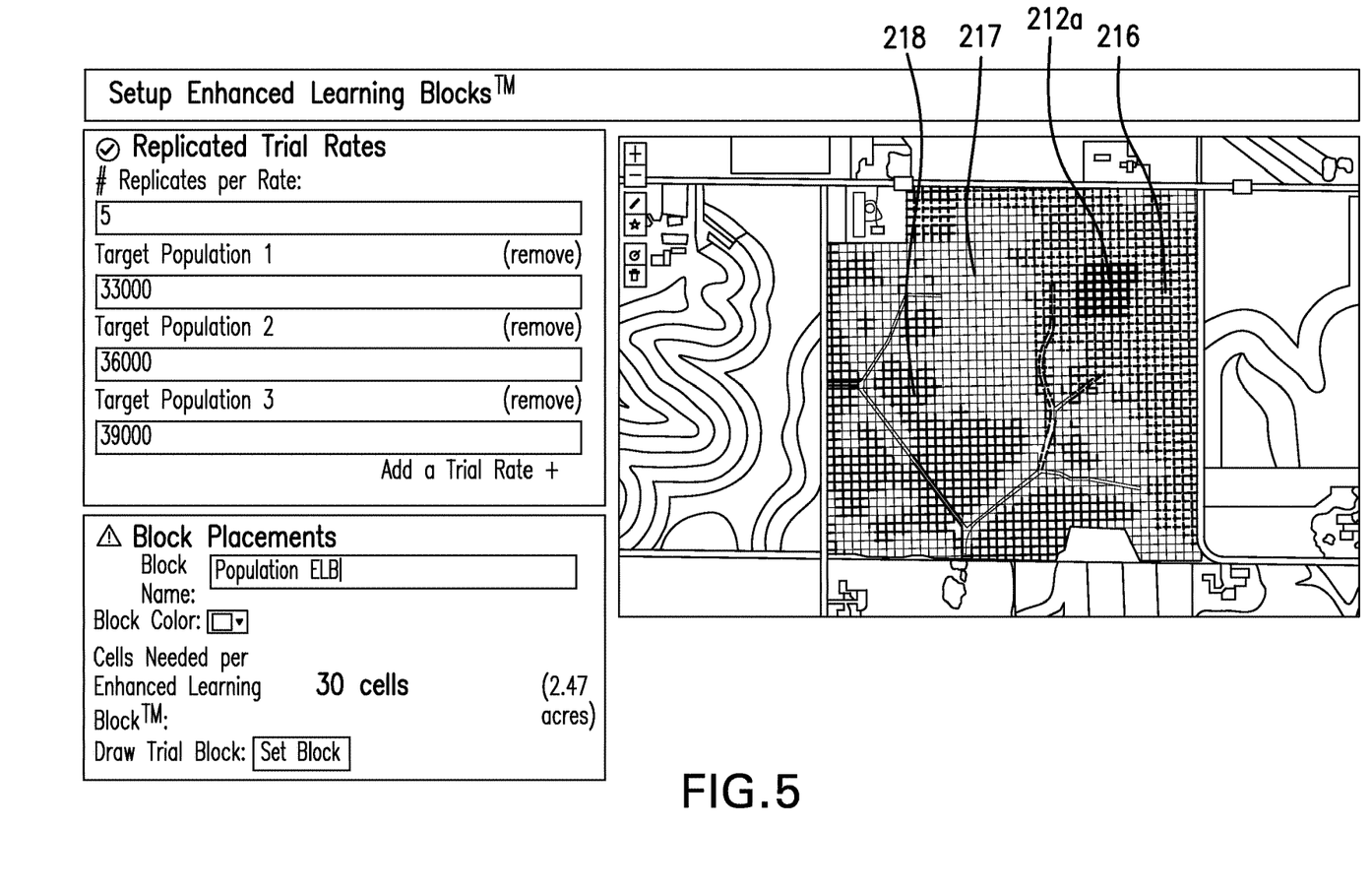
FIG. 5 illustrates a screenshot for defining the number of replications for each target rate in the test plot within the system of FIG. 1.
Figure 6:
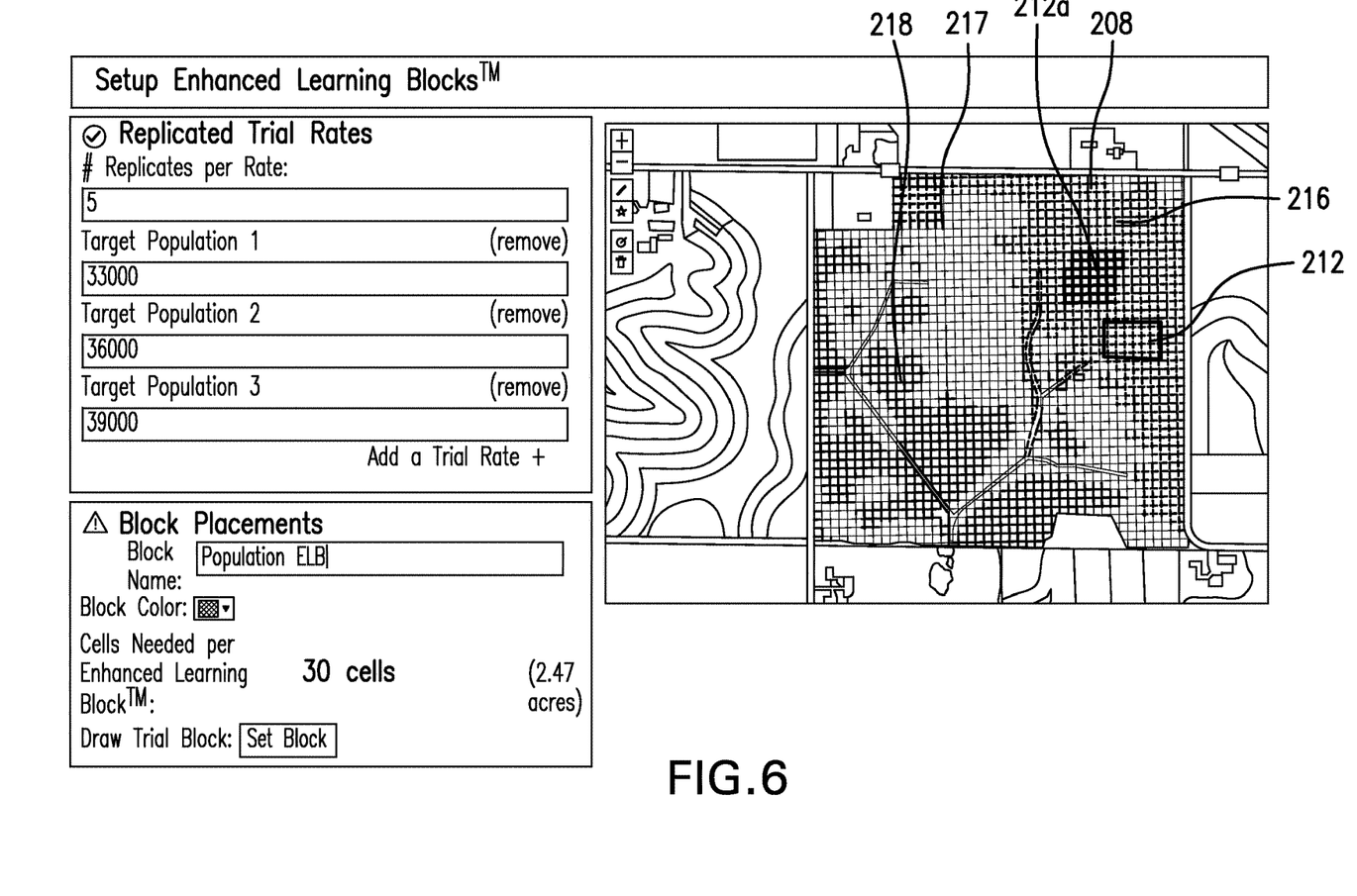
FIG. 6 illustrates a screenshot showing the agricultural farm field with defined test plots of the system of FIG. 1.

Once the intended travel path for machine 220 across agricultural farm field 214 is captured, a processing function occurs in system logic 104 where the previously loaded data about agricultural farm field 214 (e.g., management zones and target plant populations) are overlaid on a grid 208, as shown in FIG. 4. Grid 208 is shaded/colored with different plant population profiles that correspond with target population information 210 by system logic 104 and displayed on the right-hand side of electronic user interface 102. In this case, a rate prescription for Ag input 114, such as a seeding population prescription (same rate for the entire field or variable rate) can be created in advance, for the entire Ag field 202 the user wants to place test plot(s) 212 within. The process creates machine instructions for the entire Ag field 202 that has been enrolled into system 100, not just the test plot(s) 212, as that will be required during the field execution step. On the left-hand side of electronic user interface 102, as shown in FIG. 5, the user can define at user interface 102 Ag inputs 114, which corresponds with the number of input rates to be tested, i.e. treatment levels. Each treatment level for Ag input 114 is replicated three or more times per test plot 212(a)-(c). The spatial location for each of these replicated input rates are randomly assigned by the statistical model in system logic 104 within the test plot in order to provide valid data for subsequent statistical analysis.

Once the number of replicates and the target input rates are entered by the user in user interface 102, the user can define in each management zone the location(s) of test plots 212. For optimal results, an individual test plot 212 is fully contained within a single management zone so that testing is conducted in a relatively homogenous sub-field type to minimize variation in other factors beyond the tested treatment levels. As part of this process, minimum test plot area needs to be determined. The capabilities of machine(s) 220 intended to deliver Ag inputs 114 or treatments as well as harvest the output are considered as part of this process. Such constraints of machine 220 can be stored in centralized database 116 and obtained either from the manufacturer as external data 108 or provided by the user at user interface 102.

System logic 104 calculates the time and distance required for machine 220 to do a rate change or turn on/off an application of Ag input 114 based on constraints of machine 220 and/or its dispensing system. The constraints can be one or more of a minimum rate of change in the dispensement of Ag input 114, an operating speed of the dispensing system on machine 220, a number of rows (or nozzles) the dispensing system on machine 220 can independently control, a volume of Ag input 114 that the dispensing system on machine 220 can independently control, and/or sensing capabilities of the intended harvest operation. All of this accumulates into system logic 104 defining a minimum individual treatment area. An individual area for test plot 212 is determined by multiplying the minimum individual treatment area by the number of treatment levels as well as how many times each treatment level is to be replicated. The layout of the area for test plot 212 is done with respect to the intended travel path through agricultural farm field 214 based on Ag field 202. The statistical modeling performed in system logic 104 randomly assigns the spatial location of each treatment level replicate (individual treatment areas) of Ag inputs 114 within an individual test plot 212.

Figure 7:
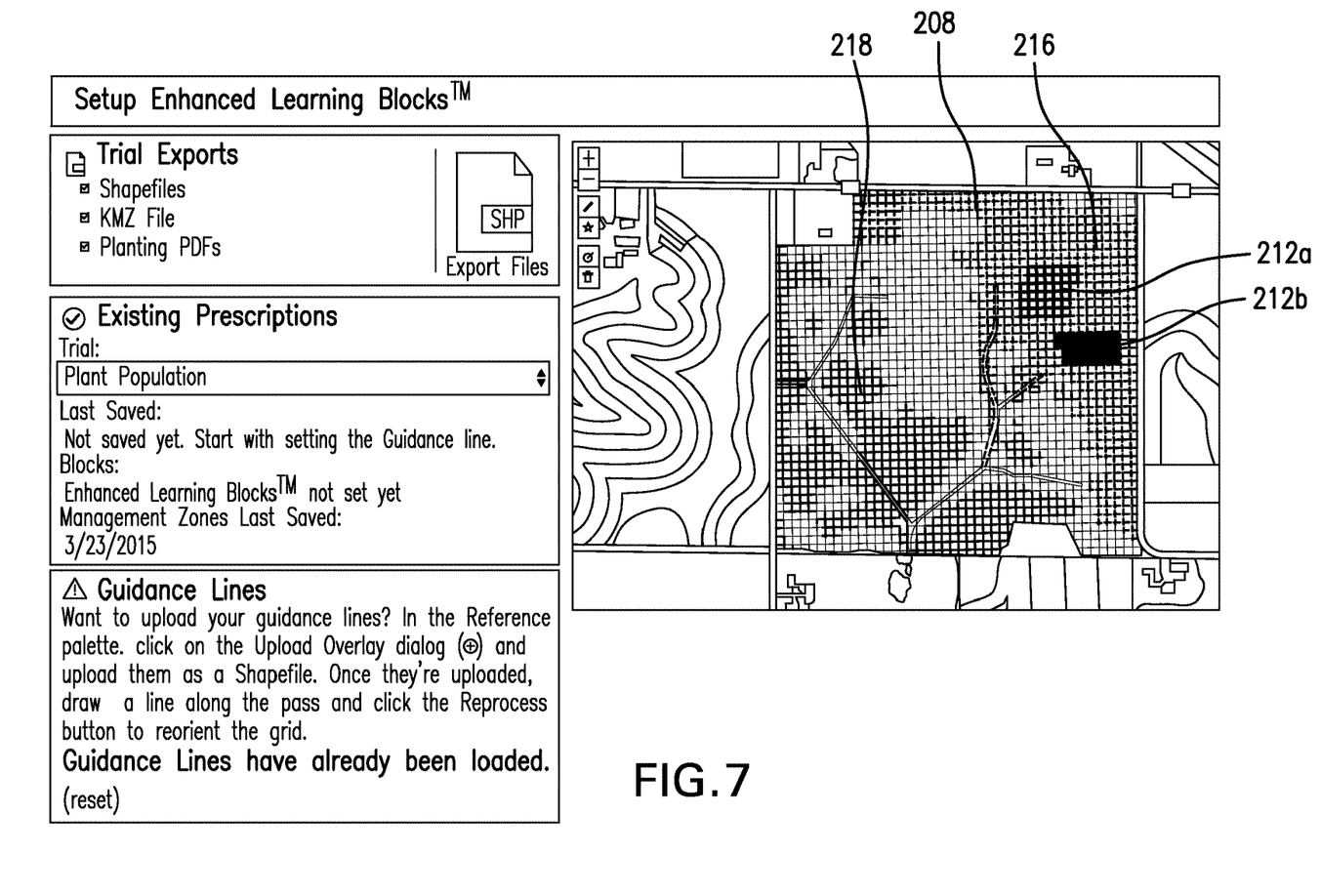
FIG. 7 illustrates a screenshot showing the test plots of the system of FIG. 11 and providing a machine setup file for an agriculture machine for the agricultural farm field and test plots.

FIG. 8A shows a test plot 212(*a*) with three treatment rates 230, 232, and 234 for Ag input 114 each replicated three or more times within test plot 212(*a*). System logic 104 has calculated the time and distance required for machine 220 to do the rate change, determined the minimum treatment area required, and laid out the area for test plot 212(*a*) with respect to an intended path of travel (in this case 10 degrees off of due North) and randomly assigned the spatial location of each treatment level replicate (individual treatment areas) of Ag input 114 within individual test plot 212(*a*). A machine setup file 120 is created for the entire Ag field (including all test plots) and provided by system 100 as external data 108. FIG. 7 shows where in user interface 102 the user initiates the action necessary to create machine setup file 120.

FIG. 8 shows agricultural farm field 214 that corresponds to Ag field 202 that was uploaded into system 100. Agricultural farm field 214 has three management zones 216, 217, and 218. Management zone 216 has two defined test plots 212(*a*) and 212(*b*) and management zone 218 has one defined test plot 212(*c*). Machine setup file 120 is loaded into a controller 300 onboard machine 220, which also receives GPS location information from satellite 221. Machine 220 has controller 300 operatively connected to a dispensing system that is configured to change the dispensement of Ag input 114 from the dispensing system in a predetermined manner within each predefined test plots 212*a* and 212*b* in the management zone 216. Machine 220 travels through agricultural farm field 214 placing Ag inputs 114 in the typical manner until it reaches test plots 212(*a*)-(*c*) where it applies the Ag inputs 114 as previously defined. Machine 220 can be any agricultural machine with a dispensing system for applying Ag inputs 114, for example, tractors, planters, air seeders, sprayers (ground-based or airplane), irrigation equipment, tillage equipment (agronomic output impact on different machine setting levels), harvesters (agronomic output impact on different machine setting levels), etc.

The foregoing automates the process to provide randomized and replicated predefined treatment levels within test plots 212 within management zones 216-218 in agricultural farm field 214 to create datasets of agronomic response to tested treatment levels that are appropriate for use in well-established and universally recognized statistical analyses. A simple example could include analyzing three different seeding rates in a management zone 216, 217, or 218 at the same time as three different nitrogen levels (i.e., 3×3=9 unique treatment levels). If each permutation is replicated three times, there will need to be twenty-seven randomly placed treatment areas within a single test plot 212. The data and/or statistical analysis output from test plot 212 can also be aggregated and compared on a regional level with results from other test plots with and without similar background conditions (e.g., different management zone "makeup"). This allows growers and their agronomic advisors, for example, to account for growing season weather that may vary between test plots in a region or between different growing seasons/years as well as other factors that may vary within a test plot, such as soil fertility levels, or factors that may vary between test plots like corn hybrid or seeding rates.

It is important for machine 220 being used to monitor the dispensement of Ag input 114 to generate an application record to associate an intended location for the predetermined change of the dispensement rate of Ag input 114 with an actual location for the predetermined change of the dispensement rate of the Ag input 114, in order to confirm successful execution of the treatment levels of Ag input 114 in each test plot 212. During harvest, yield data (e.g., volume, moisture, quality attributes like protein) can be observed and recorded for multiple locations in each test plot 212 in an automated fashion using sensor technology on the harvesting equipment. Such harvest observations can be automatically sent to centralized database 116 via wireless connection or provided by user through user interface 102 of system 100. Each individual yield observation from the harvester is spatially "matched" to the respective actual treatment rate observation. The resulting data set (along with other agronomic attributes related to the area for test plot 212) can be provided to the statistical model of system logic 104 of system 100 and utilized in various statistical analysis procedures to determine if there is a significant difference in agronomic response between the evaluated treatment rates. This allows growers and agronomic advisors to easily execute test plots 212 that comply with scientific experimental design criteria, and leverage the resulting data sets to analyze yield responses to different levels of Ag inputs 114 using data that is appropriate for various statistical analyses.

Machines 220 can be planters or applicators, which can apply multiple plant rows in a single pass across agricultural farm field 214. Controller on machine 220 implementing instructions on machine setup file 120 can change the application rate for Ag input 114 as machine 220 crosses the field, in some cases within the span of machine 220; for example, the seeding application rate in adjacent rows can be varied in a test plot 212(*a*)-(*c*). At harvest time, machine 220 in the form of a harvester can collect yield data to determine the yield across the width of the plant collection platform ("header"). It is important to ensure the width of application control spatially corresponds to the harvest width (as currently that is a constraint on the spatial resolution of measuring agronomic output). As part of the determination of the minimum treatment area required system logic 104 also accounts for the time/distance required for input rate changes as well as the time/distance required for the agricultural output (i.e., "crop yield") to flow through a harvester and pass the agronomic output attribute sensor. These parameters or constraints of machine 220 need to be accounted for when designing test plots 212 to increase the chance of successful implementation of measuring the agronomic response to different treatment rates within test plots 212. The resulting data is extremely valuable for growers and their agronomic advisors.

With this data collected, growers and their agronomic advisors can identify statistically significant agronomic responses to different tested treatment levels and determine the confidence level(s) for the analyses as well as incorporate the differences in cost for each treatment level and the per unit value of the Ag output (e.g., bushels/acre or kilograms/hectare and/or protein level).

Another use case is to evaluate the agronomic impact of settings of machine 220 that cannot be adjusted automatically in agricultural farm field 214. The layout of the test plots 212 will vary from what has been described—essentially doing replicated and randomized strips through the field with the different settings (e.g., tillage depth, planting depth). It is important to note the resulting analysis of yield observations (and documentation from the application) would again focus on specific management zone areas (relatively homogenous sub-field areas which minimize variation in other agronomic factors beyond the tested treatment levels). Accounting for the sensing capabilities of the harvest operation is also important in the design of test plots 212.

Figure 9:
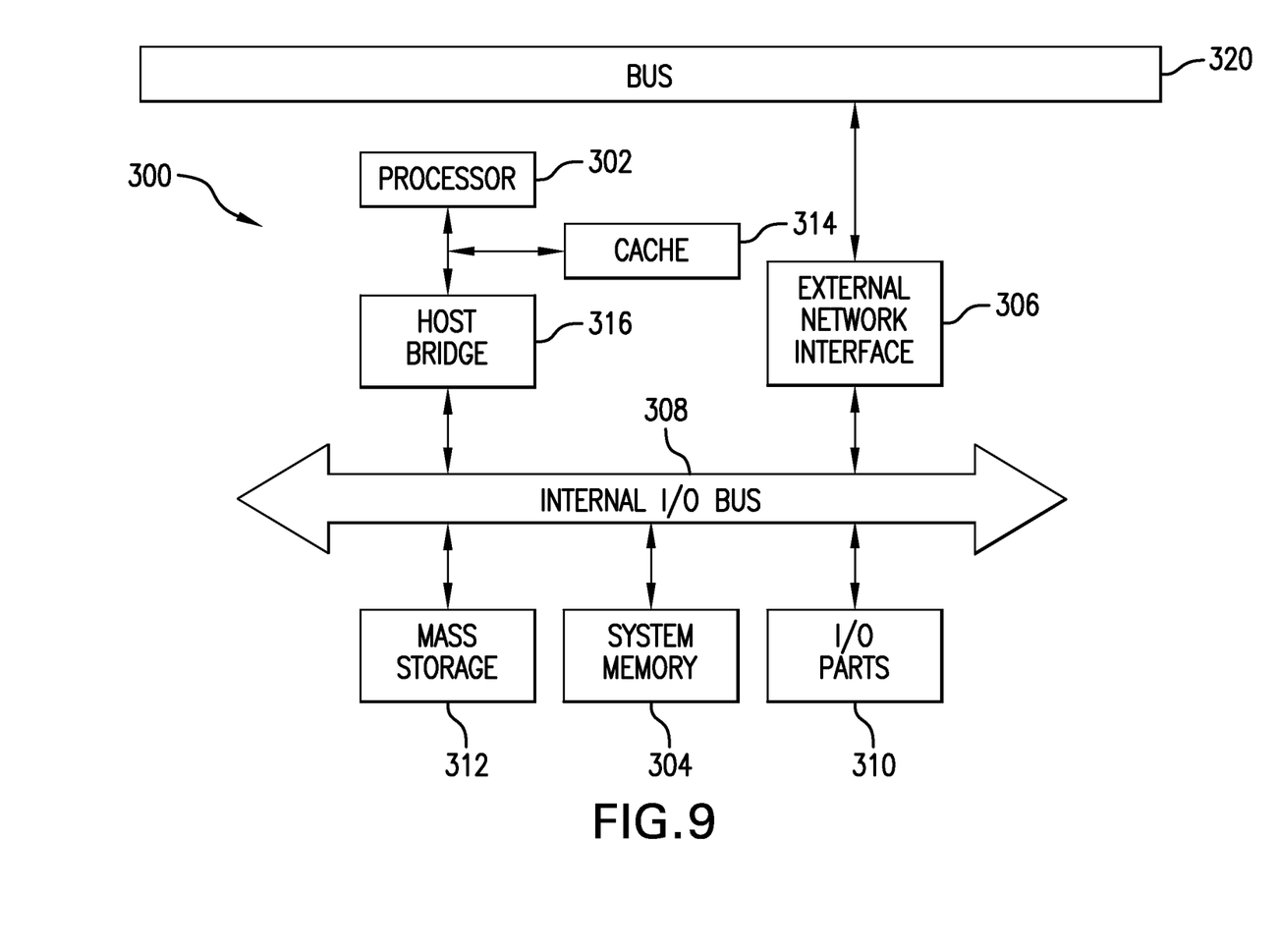
FIG. 9 is a functional block diagram illustrating hardware components of a controller in an agriculture machine.

FIG. 9 shows an exemplary controller 300 that can be connected to a controller area network bus (bus) 320 in machine 220. In one implementation, controller 300 includes a processor 302, a system memory 304, external network interfaces 306 and one or more software applications and drivers enabling or implementing the functions described herein. External network interface 306 connects GPS information data to bus 320 of controller 300. The hardware system includes a standard I/O bus 308 with I/O Ports 310 and mass storage 312 coupled thereto to store machine setup file 120. Host bridge 316 couples processor 302 to I/O bus 308. The hardware system may further include video memory and a display device coupled to the video memory. Collectively, these elements are intended to represent a broad category of computer hardware systems, including but not limited to general purpose computer systems based on the Pentium processor manufactured by Intel Corporation of Santa Clara, Calif., as well as any other suitable processor.

Elements of the computer hardware system perform their conventional functions known in the art. Mass storage 312 is used to provide permanent storage for the data and programming instructions to perform the above-described functions of controlling machine 220, whereas system memory 304 (e.g., DRAM) is used to provide temporary storage for the data and programming instructions when executed by processor 302. I/O ports 310 are one or more serial and/or parallel communication ports used to provide communication between additional peripheral devices like the control/sensing systems on the dispensing system attached to machine 220, which may be coupled to hardware to receive data from sensors. Additionally, machine 220 can have a CAN BUS network to facilitate communication on machine 220, or between machine 220 and dispensing system—allowing control of electronically controlled items as well as recording of feedback from sensor systems (e.g., seeding rate on an individual row).

Controller 300 may include a variety of system architectures, and various components of controller 300 may be rearranged. For example, cache 314 may be on-chip with processor 302. Alternatively, cache 314 and processor 302 may be packed together as a "processor module," with processor 302 being referred to as the "processor core." Furthermore, certain implementations of the claimed embodiments may not require nor include all the above components. For example, additional components may be included controller 300, such as additional processors, storage devices, or memories.

While the present invention has been particularly shown and described with reference to exemplary embodiments thereof, it should be understood by those of ordinary skill in the art that various changes, substitutions and alterations can be made herein without departing from the scope of the invention as defined by the appended claims and their equivalents.

What is claimed is:

1. A method comprising:
   identifying an intended treatment application machine and an intended harvester;
   determining, based on a constraint of the treatment application machine, time or distance required for the treatment application machine to conduct an input rate dispensement change;
   determining a time or distance required for an agricultural output to flow through the harvester;
   determining, based on the determined time or distance for input rate dispensement change and time or distance required for the agricultural output to flow through the harvester, a minimum treatment area;
   determining an individual area for a test plot by multiplying the minimum treatment area by a predetermined number of treatment levels and a number of times the predetermined number of treatment levels is to be replicated;
   determining an intended travel path for the identified intended treatment application machine through a field;
   determining a layout of the test plot in the field based on the intended path for the identified intended treatment application machine;
   assigning, randomly, a spatial location of each of the treatment levels to be replicated; and
   carrying out a dispensement based on the determined individual area for the test plot.

2. The method of claim 1, wherein the constraint of the treatment application machine comprises one or more of a minimum rate of change in the input rate dispensement, an operating speed of a dispensing system on the treatment application machine, a number of rows a dispensing system on the treatment application machine can independently control, and a volume of input that the dispensing system on the treatment application machine can independently control.

3. The method of claim 1, further comprising collecting yield data, via the harvester.

4. The method of claim 3, further comprising determining crop yield or an agronomic output attribute based on the collected yield data that measures an agronomic response to at least one of the treatment levels.

5. The method of claim 4, wherein an application control of the treatment application machine corresponds spatially to a harvest width of the harvester.

6. The method of claim 1, wherein the determining the minimum treatment area is based on a constraint of the harvester comprising a harvest width of the harvester.

7. The method of claim 6, wherein the harvest width is sufficient for crop yield or an agronomic output attribute to be measured.

8. The method of claim 1, wherein the predetermined number of treatment levels is two.

9. The method of claim 1, wherein the predetermined number of treatment levels is three.

10. The method of claim 1, wherein the number of times the predetermined number of treatment levels is to be replicated is three.

11. The method of claim 1, wherein the number of times the predetermined number of treatment levels is to be replicated is five.

12. The method of claim 1, generating an application record of an actual location for the dispensement in the determined individual area for the test plot.

13. The method of claim 1, associating the determined spatial location of each of the treatment levels with the actual location for the dispensement.

14. The method of claim 1, further comprising observing, during harvest, yield data.

15. The method of claim 14, further comprising matching the observed yield data with a respective actual treatment rate.

16. The method of claim 14, further comprising determining, based on the yield data, a difference in agronomic response of a plurality of the treatment rates using statistical modeling.

17. The method of claim 1, further comprising providing instructions to the intended application machine for following a plurality of planting points and changing the dispensement based on treatment levels in the test plot.

18. The method of claim 17, wherein the instructions are chosen from at least one of tillage depth, planting depth, tillage angle, residue spread width, amendment, seed hybrid, number of seeds per area, weight of seeds per area, volume, or weight.

19. The method of claim 1, further comprising displaying the field, or a portion thereof, on a user interface.

* * * * *

UNITED STATES PATENT AND TRADEMARK OFFICE
CERTIFICATE OF CORRECTION

PATENT NO. : 10,123,474 B2
APPLICATION NO. : 14/833670
DATED : November 13, 2018
INVENTOR(S) : Dan Frieberg et al.

Page 1 of 1

It is certified that error appears in the above-identified patent and that said Letters Patent is hereby corrected as shown below:

On the Title Page

Column 1 Inventor name should read:
-- Dan FRIEBERG --.

Signed and Sealed this
Twenty-sixth Day of February, 2019

Andrei Iancu
*Director of the United States Patent and Trademark Office*